United States Patent [19]

Fox

[11] 3,908,608

[45] Sept. 30, 1975

[54] ROTARY PISTON ENGINE HAVING A TURBO-SUPERCHARGER

[76] Inventor: Hans G. Fox, 12 Diane Ct., New Providence, N.J. 07974

[22] Filed: Aug. 16, 1973

[21] Appl. No.: 388,988

[52] U.S. Cl. ............................. 123/8.05; 123/8.45
[51] Int. Cl.² ........................................ F02B 53/04
[58] Field of Search ............ 123/8.45, 8.05, 119 C; 418/255; 60/602, 603, 605

[56] References Cited
UNITED STATES PATENTS

| | | | |
|---|---|---|---|
| 2,372,076 | 3/1945 | Fowler | 418/255 |
| 2,728,330 | 12/1955 | Petersen | 123/8.45 X |
| 2,849,992 | 9/1958 | Stillebroer et al. | 123/119 C X |
| 3,228,183 | 1/1966 | Feller | 123/8.05 X |
| 3,257,796 | 6/1966 | Updike | 123/119 C X |
| 3,358,439 | 12/1967 | Castelet | 123/8.05 X |
| 3,430,436 | 3/1969 | Bader et al. | 60/602 |
| 3,591,959 | 7/1971 | Kubis | 60/605 |

FOREIGN PATENTS OR APPLICATIONS
656,229 2/1938 Germany ........................ 123/8.45

Primary Examiner—C. J. Husar
Assistant Examiner—Michael Koczo, Jr.
Attorney, Agent, or Firm—J. P. Sinnott, Esq.

[57] ABSTRACT

The invention is directed to a rotary engine in which two sets of mutually perpendicular vanes are received in a rotor and slide relative to each other. This rotor and vane assembly is seated within a combustion chamber and rotates within that chamber about an axis that is coincident with the common point of vane intersection. This center of rotation, moreover, is offset from the center of the chamber. The fuel-air mixture preferably is supplied to the combustion chamber through a supercharger, carburetor and check valve. Engine exhaust back-pressure can be selectively throttled to control pressure in the chamber and to drive a turbine that is coupled to the supercharger.

3 Claims, 3 Drawing Figures

ROTARY PISTON ENGINE HAVING A TURBO-SUPERCHARGER

BACKGROUND OF THE INVENTION

1. Field of the Invention

This invention relates to internal combustion systems and, more particularly, to rotary engines that have relatively slidable vanes within the combustion chamber, and the like.

2. Description of the Prior Art

Through the years a great deal of research has been applied to "rotary" engines. Perhaps, the earliest engine that bore this name was the rotary aircraft engine that saw so much service fifty or more years ago. In these older engines, the crankshaft remained fixed in position while the propeller, pistons and cylinders all rotated about the shaft, more or less as a unit.

More recently, attention has been focussed on a new type of rotary engine, of which the "Wankel" engine clearly is the most popular and widely known. These more recently developed rotary engines are characterized by a combustion chamber that houses a generally triangular rotor. As the rotor sweeps through one complete revolution within the combustion chamber, the ever-changing volume that is established between one side of the rotor and the immediately adjacent portion of the combustion chamber wall defines physical counterparts to the usual internal combustion engine "strokes" of fuel-air mixture intake, compression, power, and exhaust.

To convert the power generated in the foregoing manner into useful work, the inner surface of the rotor is provided with gear teeth that mesh with a small pinion gear. This seems to be the weakest link in the modern rotary engine structure. By force of circumstances the pinion gear and crank connection cannot be massive or very strong. Consequently, present-day rotary engines are confronted with a definite limitation on engine speed. Exceed this engine speed limit and the crank or gear is likely to fail.

The unusual shape of the Wankel engine combustion chamber is a further drawback to the ultimate acceptance of the modern rotary engine. In this regard, the close structural tolerances required for the efficient mass production and operation of these engines is a very difficult goal in view of this unique combustion chamber shape.

As a general matter of internal combustion engine design, there is also a desire to decrease combustion chamber surface area in order to reduce heat losses and thereby improve engine operating characteristics. The Wankel engine in some respects is not entirely satisfactory in the light of this criterion.

In summary, the new class of rotary engines that seems to be gaining a great deal of public interest does have a number of shortcomings. Severe engine speed restrictions imposed by the limited strength of the crank, a combustion chamber that is not readily adaptable to mass production, and a less than desirable combustion chamber surface area all combine to prevent these new rotary engines from realizing their full potential. Thus, there is a need to overcome these inadequacies and to provide industry and the public with the full use of this new power source.

SUMMARY OF THE INVENTION

In accordance with the invention, these and other rotary engine problems are solved to a large extent through an almost circular combustion chamber that accommodates at least two mutually perpendicular vanes. These vanes are mounted in a rotor that is slightly offset from the center of the combustion chamber. The vanes, moreover, are slidable relative to each other and intersect on a line that is coincident with rotational axis of the rotor.

The outer surface of the rotor is provided with four recesses that are each individual to a respective vane. These recesses provide larger bearing surfaces for the expanding gases of combustion. These surfaces tend to convert the combustion gas pressures into forces that are perpendicular to the radial direction of the adjacent vane, thereby producing greater torque and engine power.

Preferably, the rotor is hollow and filled with oil under pressure to cool the engine and to lubricate the sliding vanes.

The inner surface of the combustion chamber, it will be recalled, is not quite circular in transverse cross section, but is, instead, a compound surface that combines several radii of curvature to accommodate the non-circular path traced by the tips of the vanes as they sweep through one complete rotation.

The combustion chamber, moreover, is manufactured through a grinding process in which the cutting or grinding tools reproduce the motion of the vanes. This is, of course, an outstanding production economy that is readily adaptable to mass production and close manufacturing tolerance.

An additional feature of the invention includes a supercharger to provide air under greater than atmospheric pressure to the carburetor. The fuel-air mixture then flows through a check-valve and into the combustion chamber. If a higher compression system is to be used with "low lead" or "no lead" fuels, direct fuel injection to the combustion chamber can be combined with or, perhaps, substituted for carburetting.

If the engine exhaust is used to drive a supercharger turbine, a throttle can be interposed between the combustion chamber and the turbine to regulate back pressure in the chamber and the speed of the supercharger.

Clearly, the foregoing structural features of the invention overcome many of the disadvantages that have beset the Wankel engine. The rotor and vanes which deliver high engine torque while rotating about the rotor axis, for example, eliminate the unsatisfactory structural weakness of the Wankel engine crank.

The relatively simple combustion chamber shape, with which the rotor tips are in contact through each complete sweep, provides a basis for mass engine production—using grinding tools that are similar to the engine vanes. This technique is particularly suited to mass production techniques.

The combustion chamber that characterizes the invention also has a smaller surface area for a given volume than other rotary engine designs. This, as mentioned above, enhances the thermal efficiency of engines that characterize the principles of the invention.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illus-

DETAILED DESCRIPTION OF THE PREFERRED EMBODIMENTS

Figure 1:
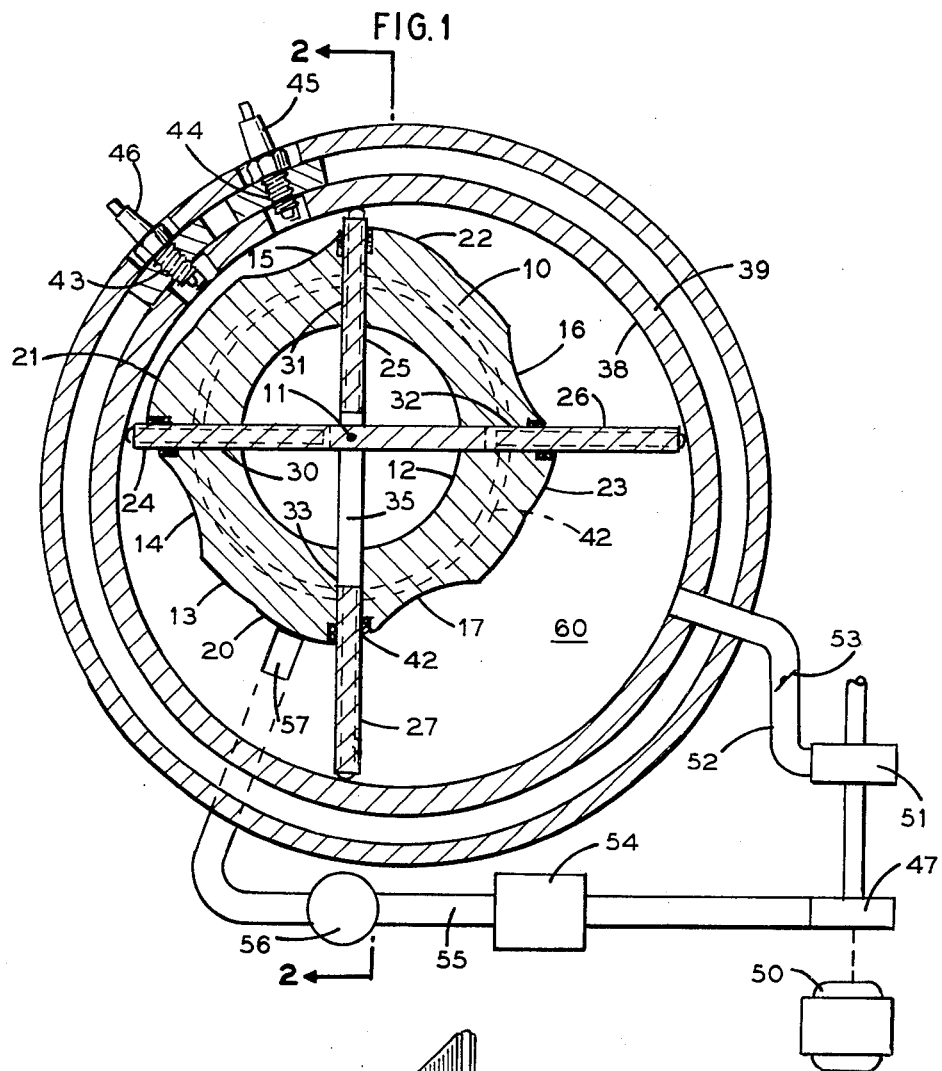
FIG. 1 is a transverse view in full section of an engine embodying many features of the invention, taken along the line 1—1 of FIG. 2 and looking in the direction of the arrows.
Figure 2:
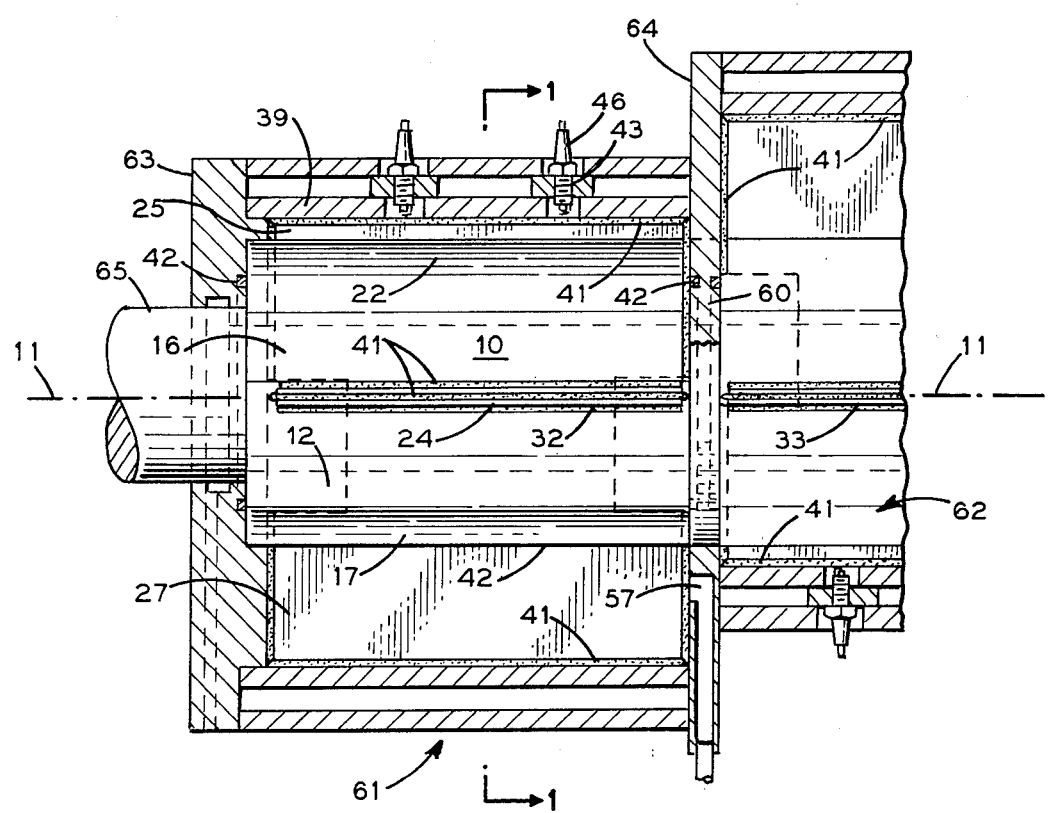
FIG. 2 is a side view of the engine shown in FIG. 1, taken along the line 2—2 of FIG. 1, and looking in the direction of the arrows.

The illustrative embodiment of the invention shown in FIG. 1 has a rotor 10 that rotates about an axis 11. The axis 11 is best shown in FIG. 2. The rotor 10, moreover, has a hollow center 12 that is filled with oil under pressure for cooling and lubrication as described subsequently in more complete detail. Outer rotor surface 13 is generally cylindrical. In accordance with a feature of the invention, however, the outer rotor surface 13 is provided with four recesses 14, 15, 16, and 17. In order to enhance the relative depth of these recesses, the outer rotor surface 13 also has four built-up portions 20, 21, 22, and 23.

These built-up portions 21, 22, 23 and 20 also provide additional structural reinforcement for adjacent respective sliding vanes 24, 25, 26, and 27. These vanes slide in a radial direction in axially aligned slots 30, 31, 32, and 33 that are formed in the rotor 10. For the purpose of the present invention, these vanes can be formed from a titanium alloy or other high temperature, high strength material of a type that frequently is used for turbine blades in jet engines.

Figure 3:
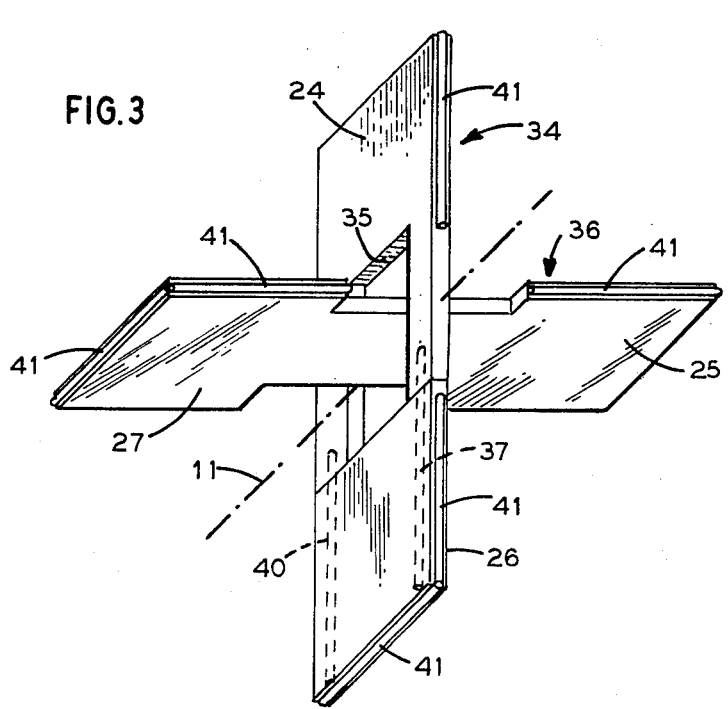
FIG. 3 is a perspective view of the engine vanes that are shown in FIGS. 1 and 2.

The sets of vanes, moreover, are formed in pairs from single plates. Thus, as shown in FIG. 3, the vanes 24 and 26 are assembled into a single, rectangular plate 34. The plate 34 has a centrally disposed rectangular slot 35 in the midportion. The diagonal dimension of the slot 35 is sufficiently long to enable the broadest portion of the blade 25 to pass through and, in this manner, to enable the four mutually perpendicular blades to be seated in the rotor 10. The transverse dimension of the slot 35 also must be adequate to accommodate the full extent of the radial motion of the blades 24 and 26 with respect to the blades 25 and 27 on plate 36 as described subsequently in more complete detail. To provide the blades 25 and 27 with this needed degree of radial movement, the central portion of the plate 36 is narrow. This narrow central portion is sufficient to give adequate clearance through the slot 35 in the plate 34 and is great enough to allow the plate to have the required degree of motion in radial directions, as described subsequently.

Naturally, the plates 34 and 36 can be manufactured in any number of convenient ways. As illustrated in FIG. 3, for example, a pair of fully recessed bolts 37 and 40 pin the vane 26 to the body of the plate 34. The individual vanes also can be assembled in different manner, the technique shown herein being preferably in a number of circumstances.

In order to establish a tight seal between the tips and edges of the individual vanes and inner surface 38 of a combustion chamber 39, seals 41 are embedded in the tips and contact edges of all of the vanes. The seals, furthermore, can be spring loaded (not shown) to bear against the adjacent chamber surfaces. Seals of the sort that are used in ordinary high-speed, high-temperature rotating machinery are suitable in these circumstances.

The individual vanes, it will be recalled, slide in radial directions in the rotor slots 30, 31, 32, and 33. A further set of seals 42 (FIG. 1) are embedded in the rotor adjacent to the sliding vanes. If these further seals 42 are located near the outer rotor surface 13 they will promote better vane lubrication. The life of these seals, however, will tend to be rather short because of the exposure to high temperature near the rotor surface. If these seals 42 are moved radially in toward the inner surface of the rotor 10, seal life will be improved, albeit at the cost of less satisfactory vane lubrication.

The plates that form the vanes 24, 25, 26, and 27, when mounted in the rotor 10, slide back-and-forth through a common axis 11 (FIGS. 1 and 3) that coincides with the rotor's axis of rotation. The trace that is defined by the vane tips, in this situation, is not circular but is a compound curve, a curve that has two or more radii of curvature. It is, essentially, this compound curve that defines the shape of the combustion chamber's inner surface 38.

To manufacture this surface on a mass-production basis, after rough combustion chamber machining is complete, a set of vanes, similar to those shown in FIG. 1 can be driven around the chamber. If the seals 41 are replaced by grinding materials, the inner surface of the combustion chamber will be ground into the proper shape. A further recess is formed in the combustion chamber inner surface 38 to provide an additional volume that is needed to accommodate the gas volume generated in the combustion that occurs during the "power stroke", in some circumstances.

Tapped apertures 43 and 44 are drilled through the wall of the coolant jacket and the combustion chamber 39 to hold recessed spark plugs 45 and 46. These spark plugs can operate intermittently, alternately (to reduce the load on the individual spark plugs) or both of the spark plugs can operate continuously, depending on the circumstances.

As shown in FIG. 1, air is supplied to the engine through a compressor or supercharger 47. At low engine speeds or power, the supercharger 47 can be driven by means of an electric motor 50. During ordinary engine operation, it is preferable to use a turbine 51 to drive the supercharger. The turbine draws power from the engine exhaust in an exhaust manifold 52 that communicates with the combustion chamber. To regulate the speed of the turbine 51 and to control the back pressure in the combustion chamber, a throttle 53 is interposed in the manifold 52 between the turbine 51 and the combustion chamber.

Turning once more to the supercharger 47, air at high pressure is discharged from the supercharger into a carburetor 54. The fuel-air mixture then flows from the carburetor through an inlet manifold 55, past a check valve 56 and into the combustion chamber by way of an inlet aperture 57 that is formed in a transverse wall or partition 60 that forms one side of the combustion chamber. The check valve 56 prevents the fuel air mixture from flowing back into the carburetor 54 during the compression cycle.

As shown in FIG. 1, the inlet 57 is radially positioned close to the outer rotor surface 13 in order to provide the maximum available time for the fuel-air mixture to flow into the combustion chamber between successive sweeps of the individual vanes 24, 25, 26, and 27. If necessary, oil can also be mixed with the fuel-air mixture to provide further combustion chamber lubrication. Direct fuel injection is a further optional feature of the invention that can be used in conjunction with, or in lieu of, the carburetor 54. Direct fuel injection is particularly useful if the engine is to be operated in the higher compression ratios with no-lead or low lead fuels. At even greater compression ratios, deisel operation is possible. This, of course, eliminates the need for an ignition system. In this regard the engine characterizing the instant invention is capable of compression ratios of about 20 to 1 in contrast to the Wankel engine that enjoys a maximum compression ratio of not more than about 11.5 to 1.

A further, more subtle advantage of the invention is shown in FIG. 2. As illustrated, two rotary engines 61 and 62 essentially share the common rotor 10. The common rotational axis 11, moreover, enables a number of these individual units to be mounted in tandem without creating excessive vibration or other complications. The individual engines are separated from each other by lubricated bearings 63 and 64. It should be noted that a portion of the bearing 64 also provides the combustion chamber partition 60.

A drive shaft 65 is aligned with the rotor axis 11 and provides the power output for the engines 61 and 62.

In operation, the motor 50 is energized to drive the supercharger 47. High pressure air from the supercharger 47 flows through the carburetor 54 and mixes with fuel to establish a desired fuel-air mixture for the engine. The fuel-air mixture passes through the check valve 56 in the inlet manifold 55. The mixture then enters the combustion chamber through the inlet aperture 57 in order to enter the engine.

If two or more engines, as shown in FIG. 2, are to operate in conjunction with the same rotor, parallel fuel systems can be provided. Alternatively, one fuel system can be manifolded to all of the engines associated with the rotor 10.

The charge of fuel and air is trapped between the outer rotor surface 13, two adjacent vanes and a portion of the inner combustion chamber surface 38. The vanes and the entrapped charge sweep in a clock-wise direction as viewed in FIG. 1 of the drawing. The diminishing volume of the chamber 39 tends to compress the charge. As the vanes sweep through the full engine cycle, they must shift back-and-forth through the rotor 10 under the control of the inner combustion chamber surface 38, against which the tips of each of the vanes must bear. This more-or-less reciprocating vane motion serves to lubricate the individual vanes as they pass through the oil-filled hollow rotor center 12.

The compressed charge is swept into communication with the ignition system. The spark plugs 45 and 46 ignite the compressed fuel-air mixture and cause this mixture to generate combustion gases that apply pressure to the exposed vane and the associated recess. This application of combustion gas pressure is converted by the moving vane and rotor assembly into a powerful torque that drives the rotor around through the operational cycle.

The burned gases leave the combustion chamber 39 through the exhaust manifold 52. The gases in the manifold 52 are throttled 53 to provide a desired back pressure in the combustion chamber and to generate the needed power output in the turbine 51 that will drive the supercharger 47 at the requisite air compression ratio without the aid of the electric motor 50. The turbine exhaust is discharged to the atmosphere.

Aside from producing a better, less atmospherically polluting exhaust, engines that characterize the invention deliver power smoothly and with a quick response to changes in demand.

Although four vanes are shown and described for the purpose of illustration, this number can be increased, according to needs. The illustrative four vanes, it should be noted, deliver four power strokes for each revolution of the rotor 10. Thus, a very compact engine is capable of delivering a great deal of power during each revolution of the rotor 10 without generating a great deal of vibration. Many of these advantages are possible because the rotational axis 11 of the rotor 10 coincides with the line of common intersection of the vanes. This rotational axis is, as shown in FIG. 1, offset with respect to the center of the combustion chamber 39. The movement of the individual pairs of vanes in response to the shape of the inner combustion chamber surface 38 also provides a more compact engine that does not suffer inordinately great inefficiencies because of surface-to-volume heat losses.

There are even further advantages to the novel structure disclosed herein. Forming the vanes from plates that are radially slidable within the rotor tends to insure the integrity of the contact between the tips of the individual vanes and the inner surface of the combustion chamber. These plates also provide integral vanes that are strong and durable and move as a coordinated unit that traces out the exact shape of the inner surface of the combustion chamber as the vanes sweep through each engine cycle.

I claim:

1. An engine comprising a combustion chamber having an inner surface, a rotor within said chamber for rotation through 360° about an axis, a pair of mutually intersecting vanes, said vanes being received within said rotor for sliding motion in radial directions and for movement with said rotor, said vanes having a common line of intersection that is coincident with said rotation axis, said vanes having tips that define the shape of said combustion chamber inner surface as said vane tips sweep through 360°, said combustion chamber further comprises a fuel-air mixture inlet, a manifold for supplying said fuel air mixture to the engine through said inlet, a carburetor coupled to said manifold for mixing air with said fuel, a supercharger for supplying air at greater than atmospheric pressure to said carburetor, an exhaust manifold for leading the products of a burnt fuel-air mixture from said combustion chamber, a turbine coupled to said exhaust manifold to extract power from said burnt fuel-air mixture, said turbine also being coupled to said supercharger in order to drive said supercharger, and a throttle interposed in said exhaust manifold to regulate the back pressure in said combustion chamber.

2. An engine according to claim 1 further comprising a check valve interposed in said manifold.

3. An engine according to claim 1 wherein said fuel-air mixture inlet is formed in said combustion chamber intermediate of said rotor and said vane tips in order to provide the maximum available time for the fuel-air mixture to flow into the combustion chamber between successive sweeps of each of said vanes.

* * * * *